United States Patent [19]
Young, Jr.

[11] 3,740,888
[45] June 26, 1973

[54] SIGNALLING MEANS FOR A FISHING ROD
[76] Inventor: Russell L. Young, Jr., 424 Washington St., Boonton, N.J. 07005
[22] Filed: Jan. 24, 1972
[21] Appl. No.: 220,004

[52] U.S. Cl. ................................................. 43/17
[51] Int. Cl. ............................................. A01k 97/12
[58] Field of Search ....................................... 43/17

[56] References Cited
UNITED STATES PATENTS
2,858,635   11/1958   Haeusler ............................. 43/17
2,195,692   4/1940    Bushey ............................... 43/17
2,506,370   5/1950    Leyda ................................. 43/17
3,063,185   11/1962   Dinger ................................ 43/17

Primary Examiner—Antonio F. Guida
Assistant Examiner—Daniel J. Leach
Attorney—Bernard J. Murphy

[57] ABSTRACT

A signalling means comprising a cylindrical carrier clamped to a fishing rod with spring-responsive elements which illuminate a lamp when an extending limb, which engages a fishing line, is strained by the line. The responsiveness of the signalling means is selectively and infinitely adjustable, and all the cooperative components are wholly enclosed within the carrier, except for the adjustment knob, the line-engaging limb and the lamp.

10 Claims, 8 Drawing Figures

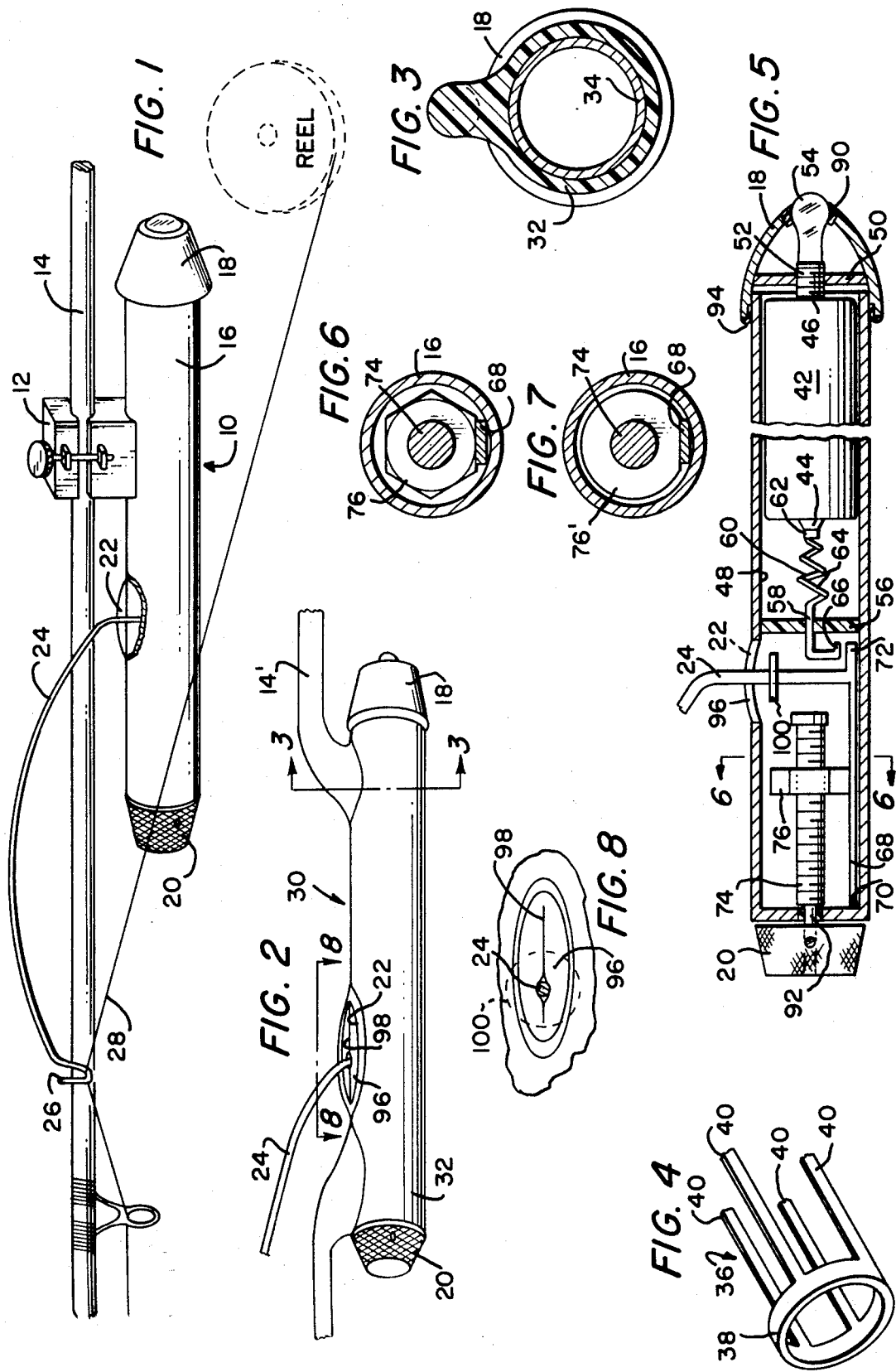

SIGNALLING MEANS FOR A FISHING ROD

This invention pertains to signalling means for a fishing rod, and in particular to such signalling means which are selectively adjustable, to vary the responsiveness thereof, and which confines the adjustment means within a fishing rod-borne carrier.

It is already known in the prior art, certainly, how to provide a fishing rod with signalling means which is responsive to a straining of the fishing line to illuminate a lamp or to sound a horn, or otherwise put forth a sensible signal. However, in all the known signalling means, either one or both of two disadvantageous features are commonly present. The one feature is that which establishes but a given, fixed responsiveness; i.e., the signalling means have a built-in responsiveness which is not adjustable. The other feature is that found in those few prior art devices where the responsiveness of the signalling means is adjustable. In these latter devices, the adjustable components are external of the fishing rod. That is, an axially-travelling adjustment knob, or an external biasing spring, and the like, are exposed and present "snagging" obstructions which do not lend themselves to sport fishing and the environs in which fishing is normally pursued. Further, most adjustable signalling means have step-adjustment arrangements. This type of adjustment is quite limited; it will frequently occur that a desired responsive-adjustment, required due to the turbulence of the stream or river being fished, will fall between two available adjustment steps, and the sought-after responsiveness cannot be achieved.

It is an object of this invention to set forth an improved signalling means for a fishing rod which avoids the limitations found in prior art signalling means. It is another object of this invention to teach signalling means for a fishing rod comprising a housing; said housing having means for effecting carriage thereof by said fishing rod, and having chamber means for replaceably supporting a bi-terminal electrical battery; bi-terminal signalling means, responsive to electrically-conducting engagement of both terminals thereof with both terminals of a bi-terminal electrical battery to produce a signal, replaceably coupled to said housing; said signalling means having a portion thereof projecting into said chamber means for effecting an electrically-conducting engagement of one terminal of said signalling means with one terminal of a chamber means-supported electrical battery; and means coupled to said housing resiliently movable for effecting an electrically-contacting engagement of the other terminal of a chamber means-supported electrical battery with the other terminal of said signalling means to cause said signalling means, in cooperation with said chamber means, to produce said signal; wherein said resiliently movable means include means selectively adjustable for infinitely controlling the resilient movement thereof, and means extending therefrom for laterally engaging fishing line of said fishing rod to cause movement of said movable means in response to a tensioning of a line engaged with said engaging means; said movable means comprises elongated, leaf spring means fixed at only one end to said housing; said extending means comprises elongated limb means fixed at only one end to said leaf spring means at an end of said leaf spring means which is opposite to said fixed one end of said leaf spring means; said selectively adjustable means comprises a rotatable screw having a threaded shank, and a travelling nut threadedly engaged with said shank, said screw being captively journaled in said housing and said nut being slidably engaged with said leaf spring means for travel along said leaf spring means in response to rotation of said screw; said leaf spring means, said one end of said limb means, said nut, and said shank are wholly enclosed within said housing; and said screw has an end portion which extends externally from said housing and has head means coupled to said end portion for facilitating selective rotation of said screw and a resulting selective positioning of said nut relative to said leaf spring means.

Further objects and features of this invention will become more apparent by reference to the following description, taken in conjunction with the accompanying figures, in which:

FIG. 1 is an isometric projection of an embodiment of the invention in which the signalling means is replaceably clamped to the fishing rod;

FIG. 2 is an isometric projection of an alternate embodiment of the invention in which the signalling means is inseparably integral with the fishing rod;

FIG. 3 is a vertical cross-sectional view of the novel means of FIG. 2 taken along section 3—3 of FIG. 2;

FIG. 4 is a perspective view of a portion of a carrier used in the FIGS. 2 and 3 embodiment;

FIG. 5 is a longitudinal cross-sectional view of the embodiment of FIG. 1;

FIG. 6 is a vertical cross-sectional view of the FIGS. 1 and 5 embodiment taken along section 6—6 of FIG. 5; and FIG. 7 is an alternate arrangement of structure for varying the bias of the enabling leaf spring, according to the invention; and FIG. 8 (from 8—8 of FIG. 2) is a fragmentary, plan view showing the novel sealing gland.

As depicted in FIG. 1, the novel signalling means 10 is clamped, by means of a clamp assembly 12, to the fishing rod 14. The signalling means 10 comprises a cylindrical, electrically-conductive tube 16 having a lamp assembly 18 at one end and an adjustment knob 20 at the other end thereof. Further, tube 16 has a lateral slot 22 formed therein — the same being shown partially broken away — to accommodate a line engaging limb 24. Limb 24 has a U-shaped termination 26 in which the fishing line is received; termination 26 effects a lateral engagement with the line, thus, it can most readily be freed from the line simply by inducing slack in the line and withdrawing same from the termination.

This first embodiment of the invention, shown in FIG. 1, prevents signalling means 10 which is easily replaceable and removable from the fishing rod 14. Thus, when the means 10 is not being used as a fishing signalling means, it can be detached and used as a hand-carried source of illumination. Whether hand-carried, or rod-carried, the depressing of limb 24 — as will become more understood upon review of the following text — will cause the lamp assembly 18 to light.

The embodiment of the invention shown in FIG. 2 sets forth a novel signalling means 30 in which the same is integral with, and formed with, the fishing rod 14'. As shown in FIG. 3 to better advantage, this being a vertical cross-section taken along section 3—3 of FIG. 2, the means 30 comprises an external pod-type housing 32 within which is confined a metal or otherwise electrically-conductive tube 34. Accordingly, housing 32 in which tube 34 is confined is of fiber glass, plastic, or other non-conductive material. A same limb 24 extends, projectingly, from a same slot 22 formed in both the housing 32 and tube 34, and means 30 further has the same lamp assembly 18 and adjustment knob 20 at either ends thereof.

In an alternate embodiment, shown in FIG. 4, the pod-type housing 32 contains an open-frame carrier 36 which comprises end rings 38 (only one of which is shown) which carry supporting struts 40 therebetween. Carrier 36 and its structural components are formed of electrically-conductive material.

To better illustrate the novel signalling means 10, FIG. 5 presents a longitudinal cross-section of the FIG. 1 embodiment. With reference to FIG. 5, it will be seen that a battery 42 having terminals 44 and 46 is supported within tube 16 in a compartment 48. The lamp assembly 18 comprises a web 50 with a threaded aperture 52 therein which receives a lamp 54 threadedly therein. An insulating wall 56 defines an end of compartment 48, the wall 56 being fixed within tube 16. Wall 56 has an aperture 58 formed in the center thereof which mounts a spring-contactor element 60 therethrough. Element 60 comprises a terminal contactor 62 at one end thereof, within compartment 48, a spring component 64, and an operative contactor 66 at the end opposite.

A leaf spring 68, shown in FIGS. 5 and 6, is carried in cantilever fashion in tube 16, as only one end thereof is fixed to tube 16 at 70. Limb 24 is joined to leaf spring 68 via one end thereof, which is opposite to fixed end 70; a minor portion of spring 68, i.e., portion 72, is therefore normally spaced from contactor 66.

A threaded screw or shaft 74 is journaled in tube 16 in the end thereof opposite lamp assembly 18, and is supported in parallel with leaf spring 68, by being rotatably fixed to the tube 16 through adjustment knob 20. Shaft 74 carries a hexagonal nut 76 thereon, a flattened portion of the nut being slidably engaged with the leaf spring 68.

With line 28 engaged with limb 24, tension exerted against or on the line will cause the leaf spring 68 to bend — with more or less ease, depending upon the location of nut 76 — to cause portion 72 to effect a contacting engagement with contactor 66. Thus, a closed circuit to lamp 54 is completed via conductive tube 16 and conductive web 50. Lamp assembly 18, in this embodiment, comprises an electrically-conductive lamp housing; thus, the mechanical engagement of the lamp housing with tube 16 insures continuity. However, where it is desired to employ a plastic or like insulative lamp housing, it remains only to have web 50 in contacting engagement with tube 16 (or carrier 36, in the FIG. 4 embodiment).

As an alternate embodiment, shown in FIG. 7, leaf spring 68 slidably receives a nut 76' which is round except for a flattened portion at one place on the periphery thereof. Other such embodiments will occur to those skilled in this art, taking teaching from my disclosure, and may comprise a rack and pinion arrangement, or the like.

My novel signalling means provides for an infinite adjustment of the responsiveness thereof, by simple rotation of knob 20 to which shaft 74 is mechanically secured. Thus, where the fishing environment, as in a rapid stream, is such as will normally strain the line 28, my signalling means provide for a knob-adjusted setting of the leaf spring responsiveness to counteract or correct for the stream turbulence. Thereafter, any signal produced by the inventive means is fairly to be interpreted as fish activity. In non-turbulent environments, as in quiet lakes, the knob adjustment will provide for a lessening of the restraint on spring 68 — by retracting nut 76 (or 76') along shaft 74.

In the embodiments depicted, my signalling means normally illuminate in the direction of the reel of the fishing rod. Accordingly, when it is necessary to unsnag the line, to handle "backlash," and the like, ready illumination of the reel is available by the simple expedient of depressing limb 24. The FIG. 1 embodiment, as priorly noted, is easily detached from the fishing rod so that it might serve as a hand-carried flashlight; this is made possible by disengaging clamp assembly 12 and withdrawing termination 26 from line 28.

For illustrative purposes, I present my signalling means as putting forth a visible signal, i.e., illumination. Clearly, my invention comprises signalling means of differing and plural characters. That is, the signalling means could just as well be aural or aural and visual.

My novel signalling means lends itself to proofing against the elements. It is well known in the art how to seal lamp assembly 18 and lamp 54 against the ingress of moisture, and the journaling of shaft 74 as well. Thus, by simply fitting a snug gland within slot 22, about limb 24, the entire novel signalling means is secured against water, dust, and the like. Accordingly, as shown in FIG. 5, my teaching comprises the use of an annular seal 90 about lamp 54, and packing 92 about shaft 74 whereat it is journaled in the housing. A further seal 94 comprises an annulus having an L-shaped cross-section and contemplates the formation of threads on the base of the "L" by means of which the seal 94 can be forceably threaded into a space defined between the lamp housing and the tube 16. Finally, then, a sealing gland 96 having a slot 98 formed therein is fixed (by cement, or equal) within slot 22. Slot 98 admits limb 24 therethrough, yet gland 96 substantially closes slot 22 against water and foreign matter. Limb 24 carries a circular plate 100, below gland 96 and slot 22, to protect contactor 66 against fracture from a too violent movement of limb 24. While I have described my invention in connection with specific embodiments thereof, it is to be clearly understood that this is done only by way of example and not as a limitation to the scope of my invention as set forth in the objects thereof and in the appended claims.

I claim:

1. Signalling means for a fishing rod, comprising:
a housing;
said housing having means for effecting carriage thereof by said fishing rod, and having chamber means for replaceably supporting a bi-terminal electrical battery;
bi-terminal signalling means, responsive to electrically-conducting engagement of both terminals thereof with both terminals of a bi-terminal electrical battery to produce a sensible signal, replaceably coupled to said housing;
said signalling means having a portion thereof projecting into said chamber means for effecting an electrically-conducting engagement of one terminal of said signalling means with one terminal of a chamber means-supported electrical battery; and
means coupled to said housing means resiliently movable for effecting an electrically-contacting engagement of the other terminal of a chamber means-supported electrical battery with the other terminal of said signalling means to cause said signalling means, in cooperation with said chamber means, to produce said signal; wherein said resiliently movable means include means selectively adjustable for infinitely controlling the resilient movement thereof, and means extending therefrom for laterally engaging fishing line of said fishing rod to cause movement of said movable means in response to a tensioning of line engaged with said engaging means;

said movable means comprises elongated, leaf spring means fixed at only one end to said housing;

said extending means comprises elongated limb means fixed at only one end to said leaf spring means at an end of said leaf spring means which is opposite to said fixed one end of said leaf spring means;

said selectively adjustable means comprises a rotatable screw having a threaded shank, and a travelling nut threadedly engaged with said shank, said screw being captively journaled in said housing and said nut being slidably engaged with said leaf spring means for travel along said leaf spring means in response to rotation of said screw;

said leaf spring means, said one end of said limb means, said nut, and said shank are wholly enclosed within said housing; and said screw has an end portion which extends externally from said housing and has head means coupled to said end portion for facilitating selective rotation of said screw and a resulting selective positioning of said nut relative to said leaf spring means.

2. Signalling means, according to claim 1, wherein:
said housing is inseparably integral with said fishing rod.

3. signalling means, according to claim 1, wherein:
said housing comprises a cylindrical tube, open at one end thereof and substantially closed at the other end thereof, having an opening formed in a portion of a side thereof intermediate said ends of said tube;
said limb means is in penetration of said side opening;
said other end of said tube has a borehole formed therein; and
said end portion of said screw is in penetration of said borehole.

4. Signalling means, according to claim 2, wherein:
said housing comprises a cylindrical carrier having a longitudinal axis; and
a cylindrical tube enclosed within said carrier.

5. Signalling means, according to claim 2, wherein:
said housing comprises a cylindrical carrier having a longitudinal axis; and
an open-frame carrier, comprising ring means which support struts extending parallel with said axis, enclosed within said carrier.

6. Signalling means for a fishing rod, comprising:
a housing;
said housing having means for effecting carriage thereof by said fishing rod, and having chamber means for replaceably supporting a bi-terminal electrical battery;
bi-terminal signalling means, responsive to electrically-conducting engagement of both terminals thereof with both terminals of a bi-terminal electrical battery to produce a signal, replaceably coupled to said housing;

said signalling means having a portion thereof projecting into said chamber means for effecting an electrically-conducting engagement of one terminal of said signalling means with one terminal of a chamber means-supported electrical battery; and means coupled to said housing means resiliently movable for effecting an electrically-contacting engagement of the other terminal of a chamber means-supported electrical battery with the other terminal of said signalling means to cause said signalling means, in cooperation with said chamber means, to produce said signal; wherein said resiliently movable means includes means selectively adjustable for infinitely controlling the resilient movement thereof, and means extending therefrom for laterally engaging fishing line of said fishing rod to cause movement of said movable means in response to a tensioning of line engaged with said engaging means;

said movable means comprises elongated, leaf spring means fixed at only one end to said housing;

said extending means comprises elongated limb means fixed at only one end to said leaf spring means at an end of said leaf spring means which is opposite to said fixed one end of said leaf spring means;

said selectively adjustable means comprises a rotatable screw having a threaded shank, and a travelling nut threadedly engaged with said shank, said screw being captively journaled in said housing and said nut being slidably engaged with said leaf spring means for travel along said leaf spring means in response to rotation of said screw;

said leaf spring means, said one end of said limb means, said nut, and said shank are wholly enclosed within said housing;

said screw has an end portion which extends externally from said housing and has head means coupled to said end portion for facilitating selective rotation of said screw and a resulting selective positioning of said nut relative to said leaf spring means;

said housing comprises a cylindrical tube, open at one end thereof and substantially closed at the other end thereof, having an opening formed in a portion of a side thereof intermediate said ends of said tube;

said limb means is in penetration of said side opening;

said other end of said tube has a borehole formed therein;

said end portion of said screw is in penetration of said borehole;

said tube is formed of electrically-conductive material;

said leaf spring means comprises a leaf spring having only one end thereof mechanically and electrically coupled to said tube adjacent to said other end of said tube, said leaf spring being formed of electrically-conductive material; and further including an aperture-ended lamp cap, of electrically-conductive material, mechanically and electrically coupled to said tube in closure of said one end of said tube, said lamp cap having an electrically-conductive web therewithin, said web having a threaded hole formed therethrough;

a lamp in penetration of the end aperture of said cap and threadedly in penetration of said web;

an electrically-insulated wall disposed within said tube effectively defining tubular compartments to either sides thereof, said wall having a spring-ended metallic conductor in penetration thereof;

said conductor comprising a linear member with a spring element extending from one end of said linear member and a contact element carried at the other end of said linear member;

said spring element being cooperative with said lamp resiliently to constrain a bi-terminal electrical battery therebetween in electrically contacting engagement; and said contact element being located within an arcuate movement path defined by movement of said leaf spring, through movement of said limb means in response to a tensioning of said fishing line.

7. Signalling means, according to claim 6, wherein:
said housing is replaceably couplable to said fishing rod.

8. Signalling means, according to claim 6, wherein:
said nut has a flattened portion formed on the periphery thereof which slidably engages a flatted portion of said leaf spring means.

9. Signalling means, according to claim 6, wherein:
said leaf spring is normally spaced from said contact element; and further including
means sealing said housing against water and foreign matter.

10. Signalling means, according to claim 7, wherein:
said housing includes means selectively operative for clamping said housing to said fishing rod and operative for unclamping and removing said housing from said fishing rod.

* * * * *